US011358724B2

(12) United States Patent
Sieben

(10) Patent No.: US 11,358,724 B2
(45) Date of Patent: Jun. 14, 2022

(54) SYSTEM FOR MANUFACTURING A KITCHEN ARRANGEMENT, KITCHEN ARRANGEMENT AND AN AIRCRAFT

(71) Applicant: Airbus Operations GmbH, Hamburg (DE)

(72) Inventor: Martin Sieben, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 1285 days.

(21) Appl. No.: 15/684,247

(22) Filed: Aug. 23, 2017

(65) Prior Publication Data

US 2017/0349289 A1 Dec. 7, 2017

Related U.S. Application Data

(63) Continuation of application No. PCT/EP2016/053679, filed on Feb. 22, 2016.

(30) Foreign Application Priority Data

Feb. 27, 2015 (DE) ..................... 10 2015 102 885.9

(51) Int. Cl.
*B64D 13/08* (2006.01)
*B64D 11/04* (2006.01)
(Continued)

(52) U.S. Cl.
CPC .......... *B64D 13/08* (2013.01); *B64D 11/0007* (2013.01); *B64D 11/04* (2013.01);
(Continued)

(58) Field of Classification Search
CPC .... B64D 11/0007; B64D 11/04; B64D 13/08; B64D 2013/0629; B64D 2011/0046
See application file for complete search history.

(56) References Cited

U.S. PATENT DOCUMENTS 3,359,751 A 12/1967 Stevens
4,361,014 A 11/1982 Blain
(Continued)

FOREIGN PATENT DOCUMENTS

DE 3209492 A1 10/1982
EP 1902647 A1 3/2008
(Continued)

OTHER PUBLICATIONS

International Searching Authority, International Search Report for International Application No. PCT/EP2016/053679 dated Apr. 25, 2016.

(Continued)

*Primary Examiner* — Nicholas McFall
(74) *Attorney, Agent, or Firm* — Jenkins, Wilson, Taylor & Hunt, P.A.

(57) ABSTRACT

A system for manufacturing a kitchen arrangement for a cabin of a vehicle includes a primary module with an electrical energy supply device, a cooling device, and at least one supply connection for supplying the primary module with a requisite. The system also includes at least one auxiliary module that is couplable with the primary module. The cooling device is set up to provide a stream of cooled fluid to a fluid outlet. At least one outer boundary surface of the primary module comprises an electrical connection coupled with the electrical energy supply device and a fluid connection coupled with the fluid outlet. The at least one outer boundary surface is adjusted for coupling with an auxiliary module having a correspondingly shaped boundary surface.

12 Claims, 6 Drawing Sheets

2
14
26
12
16
24
30
24
30
24
10
8
32
4
20
18
22
18
28
28
6

(51) Int. Cl.
*B64D 13/00* (2006.01)
*B64D 11/00* (2006.01)
*B64D 13/06* (2006.01)

(52) U.S. Cl.
CPC .... *B64D 13/006* (2013.01); *B64D 2011/0046* (2013.01); *B64D 2013/0629* (2013.01); *Y02T 50/50* (2013.01)

(56) References Cited

U.S. PATENT DOCUMENTS

| | | | | |
|---|---|---|---|---|
| 9,238,398 | B2 * | 1/2016 | Lu | B60H 1/00592 |
| 9,359,078 | B2 * | 6/2016 | Burd | B64D 11/0007 |
| 10,029,795 | B2 * | 7/2018 | Burd | B64D 11/0007 |
| 2006/0145442 | A1 | 7/2006 | Van Loon et al. | |
| 2007/0228216 | A1 * | 10/2007 | Wenstrom | B64D 11/04 244/118.5 |
| 2008/0129159 | A1 | 6/2008 | Johnson et al. | |
| 2008/0156030 | A1 | 7/2008 | Cur et al. | |
| 2010/0224726 | A1 * | 9/2010 | Lu | F25D 23/006 244/118.5 |
| 2012/0217343 | A1 * | 8/2012 | Koschberg | B64D 11/04 244/118.5 |
| 2012/0280011 | A1 | 11/2012 | Dueser | |
| 2013/0048264 | A1 * | 2/2013 | Lu | F25D 17/02 165/287 |
| 2013/0187000 | A1 | 7/2013 | Godecker et al. | |
| 2013/0269384 | A1 | 10/2013 | Burd | |
| 2014/0102120 | A1 * | 4/2014 | Libis | B64D 11/04 62/101 |
| 2018/0016018 | A1 * | 1/2018 | Burd | B64D 13/06 |

FOREIGN PATENT DOCUMENTS

| | | | |
|---|---|---|---|
| EP | 2650216 | A1 | 10/2013 |
| EP | 3 261 926 | B1 | 3/2021 |
| WO | 9614243 | A1 | 5/1996 |
| WO | 2014082719 | A1 | 6/2014 |

OTHER PUBLICATIONS

European Office Action for Application No. 16705942.7 dated Dec. 19, 2019.

* cited by examiner

SYSTEM FOR MANUFACTURING A KITCHEN ARRANGEMENT, KITCHEN ARRANGEMENT AND AN AIRCRAFT

CROSS-REFERENCE TO RELATED APPLICATION(S)

This application is a continuation of international patent application number PCT/EP2016/053679, having an international filing date of Feb. 22, 2016, which claims priority to German patent application number 10 2015 102 885.9, having a filing date of Feb. 27, 2015. Both of these referenced applications are incorporated by reference herein.

TECHNICAL FIELD

Embodiments of the subject matter described herein relate generally to a system for manufacturing a kitchen arrangement for a cabin of a vehicle with a primary module and an auxiliary module connectable thereto, a kitchen arrangement, as well as a vehicle, in particular an aircraft with a kitchen arrangement, which can be manufactured out of a primary module and at least one auxiliary module connectable thereto.

BACKGROUND

Airplanes used for transporting a large number of passengers usually exhibit kitchen arrangements, which exhibit devices for heating, cooling, preparing and storing meals and beverages, in particular given longer routes to be covered by the airplane. Since the requirements can distinctly differ by type and tasks of the kitchen arrangements depending on the aircraft operator and the routes to be covered by the airplane, the aircraft operator often desires an individual concept. This can require that a series of varying components be provided, which can be combined with each other. Depending in particular on the number of electrical devices, which generate heat and have a certain power requirement, the aircraft may require numerous different connections for a requisite, i.e., electrical energy, cooling, air suction and the like. This can increase the additional weight caused by the kitchen arrangement in the vehicle; in addition, the assembly outlay is distinctly higher than for invariably unchanging kitchen arrangements and necessary connections on board the airplane.

European patent document EP 2 650 216 A1 discloses a kitchen arrangement with a cooling device, which carries cooled fluid for cooling purposes.

BRIEF SUMMARY

An objective of the disclosed subject matter is to propose an alternative kitchen arrangement for a cabin of a vehicle, and in particular of an airplane, which can be adjusted as modularly as possible to the respective vehicle or an installation space present therein based on individual preferences, but requires the fewest possible, if any, modifications to the system for all possible arrangements, while still being able to flexibly satisfy a wide variety of tasks.

Certain benefits and advantages are achieved by a system for manufacturing a kitchen arrangement for a vehicle with the features of independent claim 1. Advantageous embodiments and further developments may be gleaned from the subclaims and following description.

Proposed is a system for manufacturing a kitchen arrangement for a cabin of a vehicle, having a primary module with an electrical energy supply device and a cooling device, wherein the cooling device is set up to provide a stream of cooled fluid to a fluid outlet, wherein at least one outer boundary surface of the primary module comprises an electrical connection coupled with the electrical energy supply device and a fluid connection coupled with the fluid outlet, and wherein the at least one outer boundary surface is tailored for coupling with an auxiliary module having a correspondingly shaped boundary surface. The primary module further comprises at least one supply connection for supplying the primary module with a requisite.

Due to its special structural design, the primary module makes up a core of an individualizable kitchen arrangement, which in addition to handling the actual tasks of a vehicle kitchen by providing holding areas, module slots for electrical devices, stowage space and the like, is also to be understood as an interface between superordinate, vehicle-bound systems and optional auxiliary modules that is attachable to the primary module. As a consequence, the primary module may have necessary structural interfaces and all system connections to the airplane that are required for all kitchen tasks. It is therefore unnecessary to separately integrate cooling devices in auxiliary modules or separately supply electrical lines from a superordinate airplane system. The entire volume flow of a cooled fluid is generated via the cooling device in the primary module, and the entire power demand is further covered by the primary module.

A supply connection for supplying the primary module with a requisite is a device with which the respective requisite is conveyed from a vehicular system to the primary module. Apart from electricity, air, centrally cooled fluid and water, the requisite may also be a heat sink for absorbing exhaust air, waste water and similar substances to be removed. The supply connection may comprise a cable, for example, which is connectable to an electrical onboard system of the vehicle, and conveys electrical current to the electrical energy supply device. The cable may be equipped with a plug- or screw connector, so that a connection to a corresponding line of the electrical network may be established during or after installation of the primary module. If the requisite is air, water or another fluid, a line with a corresponding connector may also be used, wherein a vehicular interface and/or a line arranged in the primary module that accommodates the respective requisite has a valve, so that the requisite is prevented from undesirably exiting during operation, installation or maintenance.

Therefore, only onboard connections in the area of the primary module to be installed are required to supply the entire kitchen arrangement. The onboard connections must be selected based on the needs of the corresponding vehicle operator with regard to kitchen functions, and reflect the usual constructions from prior art. For example, the onboard connections are designed as lines and/or plug connections, which lie roughly in a base area between the floor and lateral wall of a cabin, and are routed out of the floor, lateral wall or cabin ceiling, so as to then be connected with the corresponding supply connections of the primary module.

The kitchen functions provided inside a housing of the primary module itself may be any desired. The cooling device along with the electrical energy supply device are dimensioned so that the desired functions in the primary module may be smoothly satisfied, and are adequate for a corresponding arrangement of auxiliary modules.

The electrical energy supply device is used for providing electrical energy at least at the electrical connection on the at least one boundary surface. In a simplest variant, the latter may be designed as a direct line or branching from a line connected with an onboard power supply, i.e., as a passive component. Alternatively thereto, the power supply device may also be designed as a distributor and/or converter, which exhibits a transformer or inverter, for example, so that different voltages and voltage types may be generated inside of the primary module. Several strands of electrical lines may also be guided to one or more electrical connections on one or two boundary surfaces, which carry different voltages or voltage types, and further are secured by separate protective devices. It is further conceivable to use autonomous devices that supply electrical energy, for example a fuel cell.

In order to allow an energy management concentrated on the primary module that optimally distributes the provided energy budget to the primary module and auxiliary modules, it may also be favorable to equip the power supply device with a control unit actuated via a bus, a data line or a data network. Apart from the ability to selectively switch individual strands of electrical lines to auxiliary modules, energy consumers may also be monitored, and influenced as a function of priorities, flight condition and available energy budget. In like manner, it is advisable to provide a data interface, which is mechanically integrated into the electrical connection or in the immediate vicinity. The provision of power supply and data, as well as of two different power supplies, may lead to the installation of two or more transfer points from the primary module to the auxiliary module owing to segregation provisions. In order to simplify the electrical connection, the data interface may also be realized immediately via the electrical line using the so-called power-line method. In an auxiliary module, corresponding devices may then be installed, information about condition, power consumption, temperatures and the like may be transferred from the devices installed in the auxiliary module to the primary module, so that efficient energy management may there take place. The primary module may also be set up to actuate the components installed in the auxiliary modules by way of the data interface within the framework of energy management.

Depending on the design of the power supply device, it makes sense to provide enough distance between the electrical power device and any heat generating devices inside of the primary module, in particular to prevent exposure to heat from impairing electronic units.

The cooling device may be based on various devices, which are able to provide a continuous flow of cooled fluid. The list is not conclusive, but must rather be understood as only a suggestion for the expert. In an airplane or some other vehicle with a high passenger capacity and several kitchens, it may be advisable to generate cold at a central location inside of the aircraft fuselage ("remote-chiller principle") and convey it to several kitchens via a liquid refrigerant. In this case, the cooling device arranged in the primary module may comprise a heat exchanger, through which the liquid refrigerant streams, so that the heat exchanger may cool air originating from the environment or a dedicated line, and allow it to flow to the fluid outlet after cooled. A blower is here preferably located on an air inlet of the respective heat exchanger. Alternatively, pressurized air from a dedicated air duct may be guided through the heat exchanger without any further active means, for example adjusted by a screen in the volume flow. The cooling device may further also be an active cooling device, for example which may generate and provide a sufficient volume flow of cooled fluid via an evaporation process, an absorption process or other suitable measures.

In particular, the at least one outer boundary surface is a surface comprised of a front surface not facing the user. It is especially advisable to use a lateral surface of the housing of the primary module for this purpose, so that a primary module may be expanded by laterally placed auxiliary modules, hereby forming a uniform, harmonious front with a desired width for filling out the corresponding installation. In addition, the vertical extension of the primary module and auxiliary modules may be varied, making it very easy to adjust the kitchen arrangement to a curved fuselage wall or the like, in front of which the kitchen arrangement is located.

The at least one boundary surface may further also comprise mechanical means, with which the auxiliary module may at least partially be fixed to the primary module. These may encompass fastening means, with which an auxiliary module with a correspondingly shaped boundary surface may be mechanically joined with the respective boundary surface of the primary module.

Overall, the primary module for a kitchen arrangement makes it possible to realize a very readily individualizable and flexible configuration of a kitchen arrangement in a vehicle, without any modification outlay with regard to integrating electrical devices on an electrical onboard system or cooling the latter.

In an advantageous embodiment, the primary module further comprises a return flow inlet for accommodating a fluid flowing back from an auxiliary module. While continuously providing a flow of cooled fluid, devices in the auxiliary module may be cooled, but the flowing fluid becomes heated in the process, and this heat must be removed from the respective cooling site again. In particular, one simple possibility involves sending out a flow of air at a rearward end of the auxiliary module in an area of the auxiliary module close to the floor, so that it makes its way into a recirculation system during use in an airplane. On the other hand, this would require that the primary module has to be supplied with a relatively large volume flow of air, so as to be able to ensure the constant flow of cooled air through the cooling device. Arranging a return flow inlet on the at least one boundary surface allows "spent" cooling air or some other type of fluid to flow back into the primary module again, to there be reused by the cooling device. This type of circulation distinctly reduces the demand for the supply of a fluid to the primary module, and only potential leaks would then have to be compensated for. In order to realize this function, the auxiliary module must then comprise a return flow outlet arranged correspondingly to the return flow inlet, which is fluidically connected with a fluid outlet of a cooler in the auxiliary module, an interior space of a housing flooded with cooling air, or the like.

In an especially advantageous embodiment, the primary module comprises a base section, a top section arranged thereon, and a working surface arranged between the base section and top section. The working surface comprises a hollow space, which has an air outlet directed toward the base section, and is joined with a cooling air outlet as a fluid outlet of the cooling device. The hollow space further comprises a cooling air connection as a fluid connection that empties into the at least one outer boundary surface. As a consequence, the base section may preferably be positioned on a floor surface of the cabin, and forms a base extending in the direction of a cabin ceiling, which is especially suitable for providing holding areas for cabin trolleys, stowage compartments, trash receptacles and the like. The base section is bounded at its top end by a working surface, which preferably exhibits a height suitable for ergonomic operations. Located on the base section is the top section, which is separated from the base section at least geometrically by the working surface. The top section need not necessarily have the same depth as the base section. It even makes sense to give the top section a smaller overall depth, so that the front of the top section is set back a bit from the front of the base section, thereby clearing a portion of the working surface from other devices. The top section may perform tasks differing from the base section, and may, for example, provide stowage compartments for electrical devices, so-called galley inserts ("GAIN"), which are equipped in particular with dedicated electrical connections and extraction connections. As a result, the base module is also connectable with a vehicular extraction connection.

The cooling device may comprise a fluidic connection with a hollow space of the working surface, which depending on the extension of the working surface and function of the base section has one or several cooling air outlets, which is fluidically connectable with cabin trolleys through which cooling air may flow. The hollow space that extends into the working surface and is used as a cooling air line enables a particularly efficient utilization of the available installation space, since separate cooling air lines are not needed. As a result, an auxiliary module may be supplied with cooling air by arranging a type of branching line that extends to the at least one boundary surface and is fluidically connected with the hollow space. An auxiliary module may comprise a correspondingly designed working surface with hollow spaces arranged therein, and also comprise a branching line, which extends flush to the working surface of the primary module and, more precisely, to the cooling air connection.

Since the primary module and the kitchen arrangement are intended to result in flexibly selectable configurations, it must also be possible to seal such a branching line in the working surface. The production of several different working surfaces with or without cooling air connection is not especially preferred, since the costs increase with the variety of parts given the required tools and warehousing. A cooling air connection that is at least occasionally not required may be sealed with a sealing insert designed to be inserted into the cooling air outlet, thereby creating a fluid-tight cover. This covering device is preferably designed to completely seal the branching line to the hollow space, and enhance the contour of the remaining hollow space in a flush manner so as to facilitate flow. For example, if the hollow space meanders or branches, and an additional branching line is integrated thereon, the covering device may comprise the same extension as the branching line, and its end may have a profile that is adjusted to the boundary contour of the hollow space in the area of the branching line. The profile may be rounded or straight, depending on the placement of the corresponding branching line.

The cooling air connection preferably comprises a flattened profile with rounded edges. Despite a limited overall height of the working surface, the flattening makes it possible to achieve a relatively large cross section that facilitates flow for the cooling air flow.

If possible, the cooling air outlet should be arranged in an area facing the front of the base section, so that auxiliary modules that have a smaller depth, but are still intended to form a uniform front with the primary module, may also be arranged. Therefore, the cooling air outlet is preferably arranged in an area between the front and half the overall depth of the primary module.

Similarly, it is further possible to seal a return flow inlet, so that a loss of cooled air from the primary module via the return flow inlet may be prevented with the auxiliary module not secured. The return flow inlet is coverable by a plate-shaped element, depending on the size and extension of the return flow inlet.

It is also conceivable for the return flow inlet to comprise a check valve, so that the return flow inlet is opened solely given a selective demand for cooling air in the auxiliary module, and thus only if cooling air to be removed is present in a return flow inlet.

In addition, the electrical connection should be arranged on the boundary surface in such a way that it is coverable as flush as possible when not in use.

The at least one auxiliary module is suitable for coupling with a primary module mentioned above for a kitchen arrangement. The special features of the auxiliary module have to do with the corresponding positioning of an electrical connection, a return flow outlet, and the absence of connecting devices on a rear wall or the like, which have to be connected with a superordinate airplane system. The entire process of supplying the electrical devices and cooling the devices is controlled by the primary module.

In an advantageous embodiment, the auxiliary module comprises an electrical connection and a fluid connection, which are connected with an electrical connection and a fluid connection of the auxiliary module. This makes it possible to couple an auxiliary module to an auxiliary module.

An exemplary embodiment of the invention further relates to a system for manufacturing a kitchen arrangement for a vehicle, which comprises a primary module and at least one auxiliary module cited above that is couplable thereto.

An exemplary embodiment of the invention also relates to a vehicle with a cabin and a kitchen arrangement, which comprises at least one primary module and, in an advantageous embodiment, at least one auxiliary module.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Additional features, advantages and possible applications of the disclosed subject matter may be gleaned from the following description of exemplary embodiments and the figures. In addition, identical reference numbers on the figures stand for the same or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
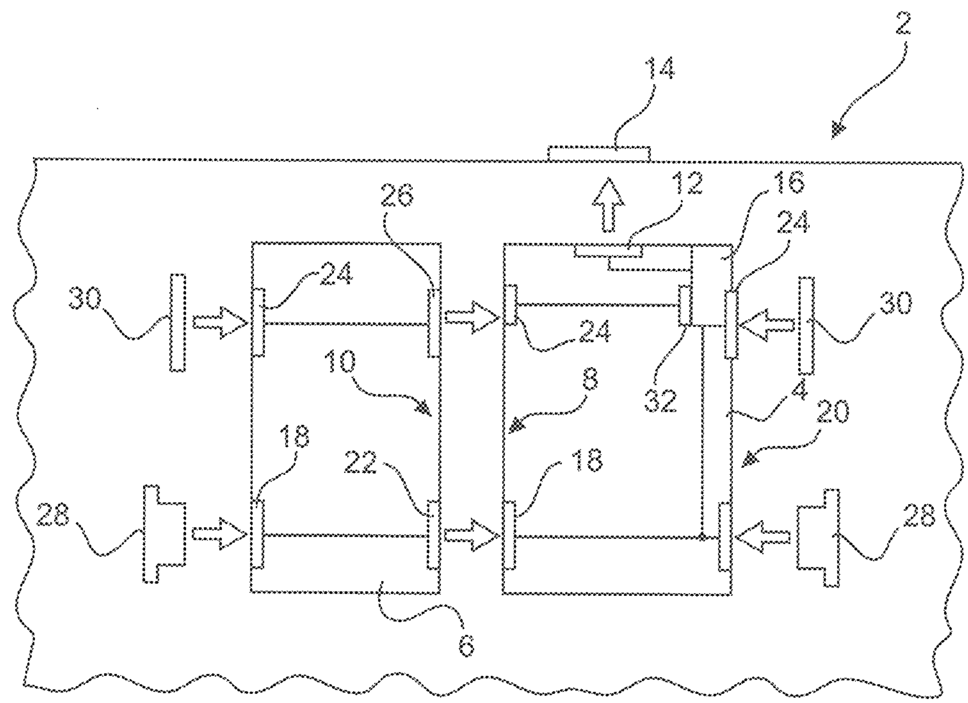
FIG. 1 shows a schematic view of the concept according to the invention with a primary module and an auxiliary module as the kitchen arrangement.

FIG. 1 shows a schematic top view of a kitchen arrangement 2 manufactured with a system according to the invention in an airplane. For example, the kitchen arrangement 2 may be arranged transverse or parallel to a longitudinal axis of the airplane, wherein the installation site may lie near a door area, at a front end or at a rearward end of a cabin set up in the airplane. If the kitchen arrangement 2 is positioned at a rearward end of the cabin, the latter may lie directly in front of a bulkhead. This area of the cabin is characterized by a cabin width that narrows in the aft direction, wherein the flexibility of the kitchen arrangement 2 allows it to be very readily adjusted to any available installation space through varying selections and spatial alignments.

The kitchen arrangement 2 includes a primary module 4 and an auxiliary module 6, which are connected with each other at two facing boundary surfaces 8 and 10, as denoted by the arrows. The primary module 4 comprises one or more supply connections 12, which is connectable with corresponding onboard outlets 14 for desired requisites. The onboard outlets 14 may take the form of concealed lines running from a floor, a wall bordering the cabin, a base area lying in between, or a cabin ceiling from outside the primary module 4. Apart from transmitting electrical power via a corresponding cable connected with an electrical network of the airplane, this may also involve data connection by way of a separate cable or via the cable connected with the electrical network, an air line, a water line, one or more suction lines for removing substances and other devices, with which the primary module 4 is equipped to perform all of the functions of a kitchen arrangement.

The primary module further comprises a cooling device 16, which is coupled with a supply connection 12, and thus may be in particular electrically operated for generating a cooled fluid, cooled air in a preferred embodiment. Alternatively, the cooling device 16 may also be supplied with a cooled liquid provided by a supply connection 12, which is generated at another location inside of the airplane, and locally cools a fluid in the cooling device 16.

Apart from using the cooled fluid inside of the primary module 4, the cooling device 16 is connected with a fluid outlet 18. The latter does not have to be arranged only on a single boundary surface 8, but may also be located in particular on an opposing side on a different boundary surface 20. Cooled fluid may be introduced by way of the fluid outlet 18 into the fluid inlet 22 of the auxiliary module 6, so as to there also perform cooling tasks. In order to keep open the possibility of installing an additional auxiliary module 6, the auxiliary module 6 may also comprise a fluid outlet 18 that is arranged on a side of the auxiliary module 6 facing away from the primary module 4, through which cooled fluid may be relayed to an additional auxiliary module 6. As a consequence, the cooled fluid in the primary module 4 and all auxiliary modules 6 coupled with the primary module 4 is prepared to cool in particular cabin trolleys accommodated therein.

The auxiliary module 6 is supplied with electrical energy via an electrical outlet 24 and an electrical inlet 26; an additional electrical outlet 24 may further also be arranged on a side of the auxiliary module 6 facing away from the primary module 4, so that additional auxiliary modules may be supplied with electrical energy.

Outlets that are not required are sealable or coverable by means of covering devices 28, which are insertable into the air outlets 18 and fastened there. This prevents cooled fluid from flowing out without another auxiliary module 6 receiving a stream of fluid. For reasons of safety, the electrical connections 24 should also be covered by corresponding cover plates 30, so as to protect the electrical outlets 24 against contaminants. The covers may be fitted with a decor tailored to the outward appearance of the kitchen arrangement 2.

The electrical outlet 24 of the primary module 4 is connected with an electrical power supply device 32, which in the simplest case is a branching or distributer rail. As already mentioned above, the electrical power supply device 32 may also include a transformer, an inverter or the like, so that any voltage waveforms and voltage levels may be provided. If desired, the electrical outlets 24 may also be monitored or actuated by a corresponding control device.

Figure 2:
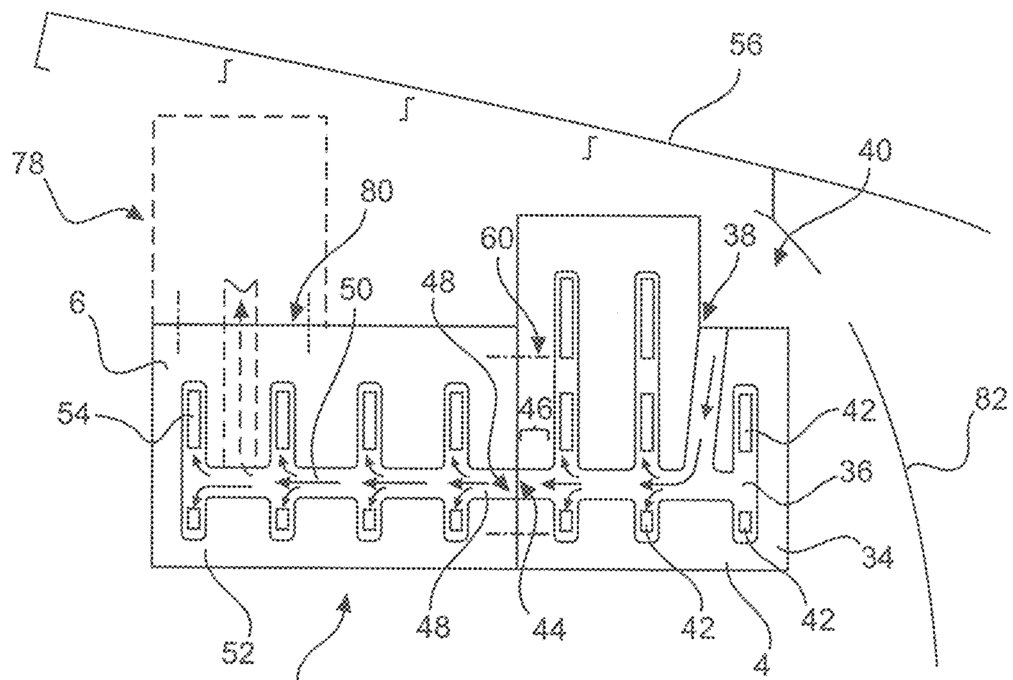
FIG. 2 shows two working surfaces coupled together with a hollow space arranged therein.

FIG. 2 shows a working surface 34, which is connectable with the cooling device 16. To this end, the working surface 34 comprises a hollow space 36 that extends into a primary extension plane and empties into an air inlet 38, which is arranged in a rearward area of the primary module 4. FIG. 2 shows a recess 40 facing away from a front or a cutout in the working surface 34, in which the cooling arrangement 16 is located. The latter may be designed as an active cooling device or a heat exchanger, through which flows a refrigerant centrally cooled inside of the airplane. As a consequence, cold air flows out of the cooling device 16 through the air inlet 38 and into the hollow space 36 of the working surface, and may exit via corresponding, downwardly directed openings 42 projecting through the lower side of the working surface 34, so as to cool cabin trolleys located thereunder with cold air. In the case depicted, for example, three cabin trolleys may be supplied with cold air in the primary module 4.

The cooling air outlet marked 18 on FIG. 1 is marked as the cooling air outlet 44 on FIG. 2, which is arranged at the end of a branching line 46 that is connected with the hollow space 36. Cold air may be introduced via the latter into a corresponding cooling air inlet 48 of the auxiliary module 6, which is also connected with a hollow space 50 of another working surface 52 by means of a branching line 48. Also provided there are openings 54, with which cooling air may be relayed to cabin trolleys or the like.

As evident from the illustration on FIG. 2, the auxiliary module 6 does not necessarily have to comprise the same overall depth as the primary module 4. In fact, an intermediate space between a fuselage wall 56 and a rear side 58 of the auxiliary module 6 would now arise, which may be filled out by other devices. This is facilitated in particular by the fact that the rear side of the auxiliary module 6 directed toward the fuselage wall 56 has no electrical or other connections. This space may correspondingly be used very easily for other purposes.

As denoted by dot-dashed lines 60, the auxiliary module 6 may be fixedly connected with the primary module 4, so that, in addition to supplying the components located in the auxiliary module 6, the primary module 4 may also provide for a mechanical integration of the auxiliary module 6.

The auxiliary module 58 on FIG. 2 may also comprise an additional receiving surface 80, to which another auxiliary module 78 is couplable. The latter does not necessarily have to be located on one side of the auxiliary module 58, but may also be arranged on its rear side. In particular in the depicted rear area of the cabin of an airplane in which a bulkhead 82 is located, the space expanding toward the front in a longitudinal direction may be used even more efficiently by such an angled shape than would be possible with conventional kitchen arrangements.

Figure 3A:
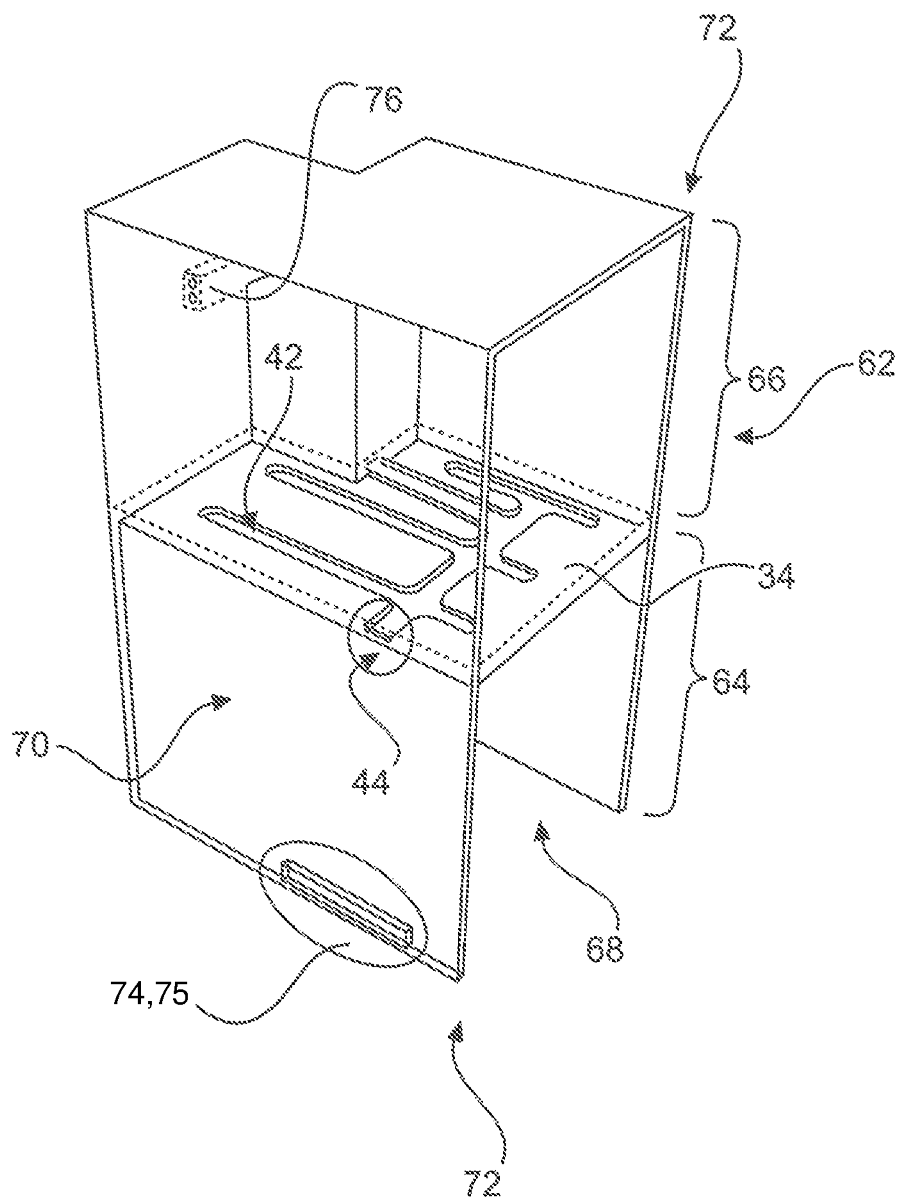
FIGS. 3*a* to 3*e* show a primary module without or with auxiliary modules in three-dimensional views.

FIG. 3*a* presents a three-dimensional representation of a possible configuration of a primary module 62, which in the case shown comprises a base section 64 and a top section 66. The base section 64 comprises three holding areas 68 for cabin trolleys, which are supplied with cold air through the openings 42 in the working surface 34 depicted on FIG. 2. In order to better illustrate the hollow space 36 in the worktop, a layer that tightly covers the hollow space 36 toward the top is omitted from the drawings. An upper edge of this covering layer is marked with a dashed line 35. This also applies analogously to all other figures, as well as to both primary and auxiliary modules in which such a hollow space is shown.

On FIG. 3*a*, the cooling air connection 44 is located on a boundary surface 70 in an area that is directed toward a front 72 and arranged between half the overall depth and the front 72. In order to receive the spent cooling air flow back from an auxiliary module that is connected with the primary module 62 and positioned on the boundary surface 70 or connected thereto, use is made of a return flow inlet 74, through which air flows back into the primary module 62 again. In some embodiments, the return flow inlet 74 comprises a check valve 75. Also located at an upper end of the top section 66 is an electrical outlet 76, which is connectable with a corresponding electrical connection of an auxiliary module.

Figure 3B:
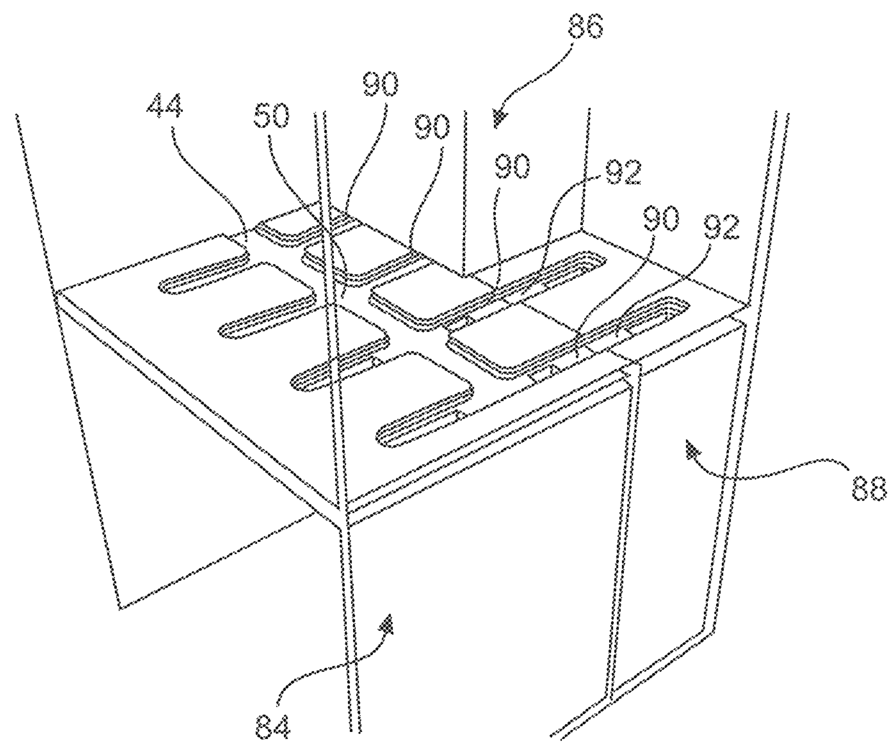
Figure 3C:
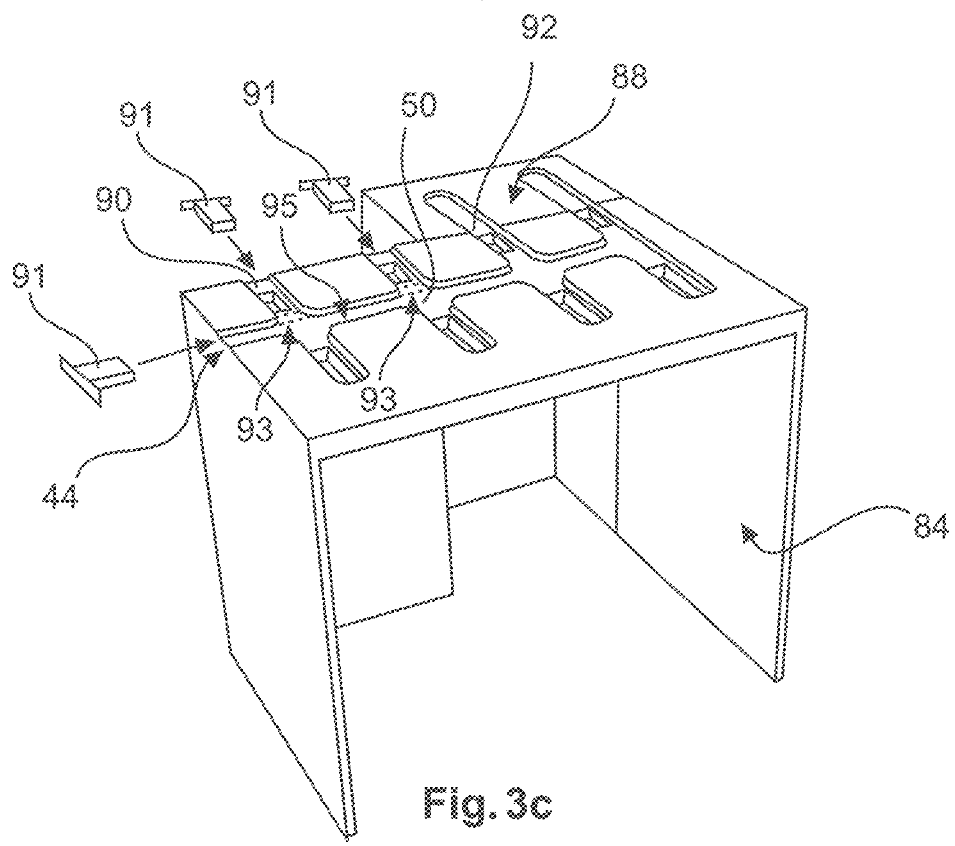

FIGS. 3*b* and 3*c* show another modification in the form of a primary module 84, which essentially corresponds to the primary module 62, except that an auxiliary module 88 is here arranged on a rear side 86. To this end, the hollow space 50 is provided with cooling air outlets 90, which are connected with cooling air inlets 92 of the auxiliary module 88. For example, the auxiliary module 88 comprises a space for two half-size trolleys. In order to ensure the flexibility of the system according to the invention, cooling air outlets 90 may at times be present, which are not used by corresponding auxiliary modules 88. The latter is sealable by correspondingly shaped covering devices 91. These preferably protrude as far into the cooling air outlets 90 as to completely fill them, and inwardly turned edges of the covering devices 91, as denoted by the dashed lines 93, extend up to a primary branch 95 formed in the hollow space 50.

Figure 3D:
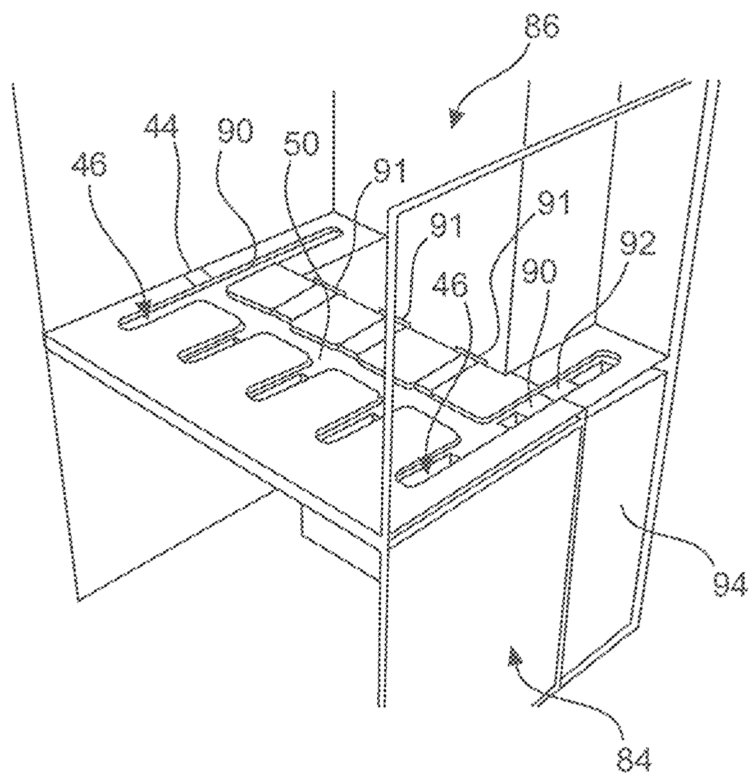
Figure 3E:
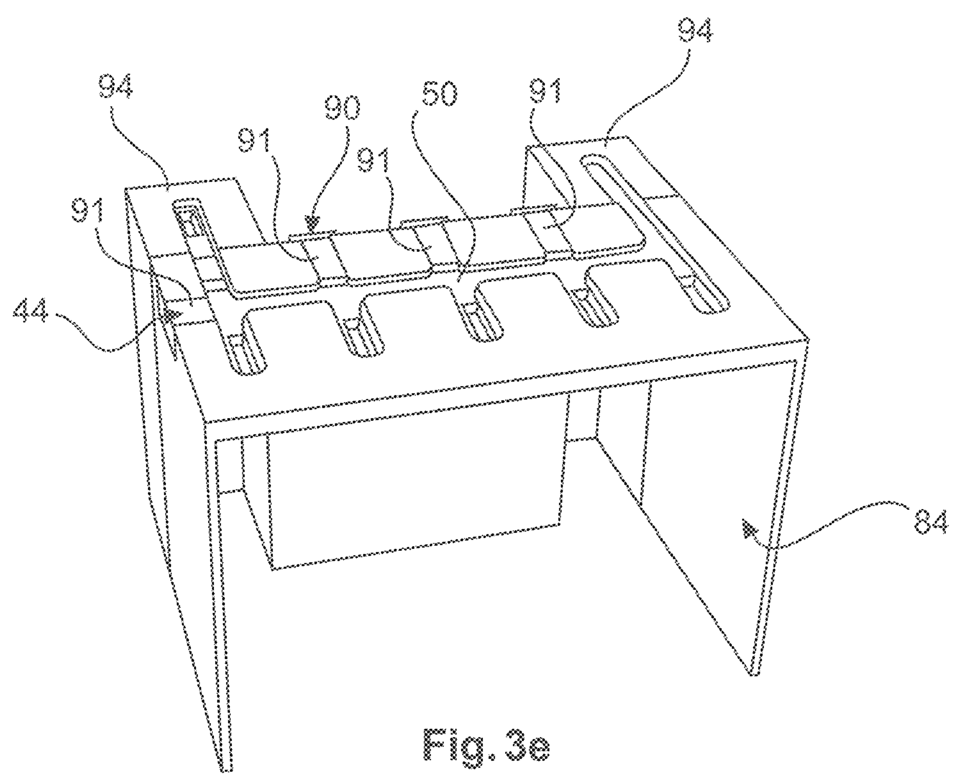

Finally, FIGS. 3*d* and 3*e* show another modification in the form of the primary module 84, in which two outer cooling air outlets 90 are connected with auxiliary modules 94 on the rear side of the primary module 84, wherein the auxiliary modules 94 each comprise a holding area for a half-size trolley.

The variants from FIGS. 3*b* to 3*e* are especially suitable for integration in a cabin area, in which adjacent passenger seats are arranged in alternating positions along the longitudinal axis of the cabin. This is known by the term "staggered seats". A primary module may comprise a front running transverse to the longitudinal axis of the cabin. The changing positions of the seats following the primary module in the longitudinal direction may result in a gap between a seat and the primary module, which is closed by the auxiliary module connected to the primary module. In particular an auxiliary module with a holding space for a half-size trolley is suitable for this purpose.

As a whole, the primary module, auxiliary module and aforementioned features enable the manufacture of an extremely flexible and easy to individualize kitchen monument, which requires the least possible modifications to a vehicular connection.

The adaptive galley concept is compatible with a system column (equivalent to, e.g., the System Port bay implemented in A350 center galleys).

In most galleys several different types of equipment (e.g., Air Chiller Unit (ACU), air ducts for trolley chilling) are located behind the trolley. This requires a volume behind the trolleys. One the one hand, this volume enlarges the footprint of the galley and reduces the available revenue space inside the aircraft cabin. One the other hand, any ducts or electrical wires that need to be routed to a location above the work deck may be routed next to the back wall of the galley behind the trolleys and Galley Inserts.

Figure 4A:
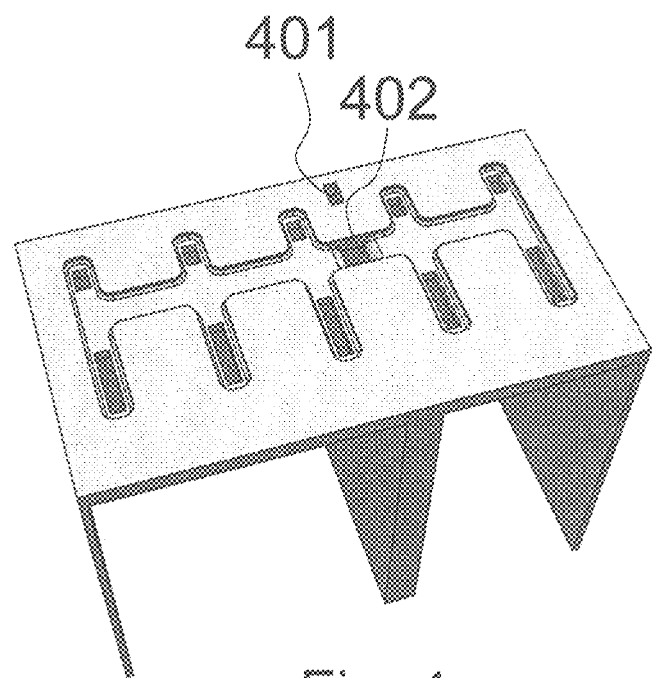
FIGS. 4*a* and 4*b* show two primary modules according to embodiments of the invention.
Figure 4B:
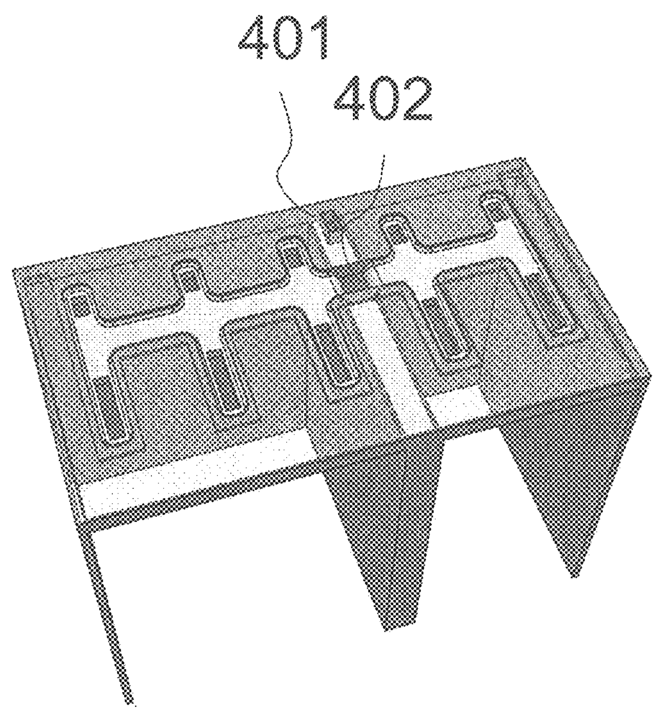

FIGS. 4*a* and 4*b* show two primary modules according to embodiments of the invention. The adaptive galley concept features a work deck cooling system, which uses an Air Chiller Unit (ACU) located in a system column between the trolleys. Therefore the volume behind trolleys is not required anymore and the footprint may be reduced.

In order to be able to route any ducts or electrical wires from below the work deck to a location above the work deck (e.g., to connect ovens), the adaptive galley concept features two cut-outs 401, 402. One for the chilled air of the ACU linked to the work deck cooling and a second cutout, preferable in the rear of the rear, for any system routing to a location above the work deck.

Figure 5A:
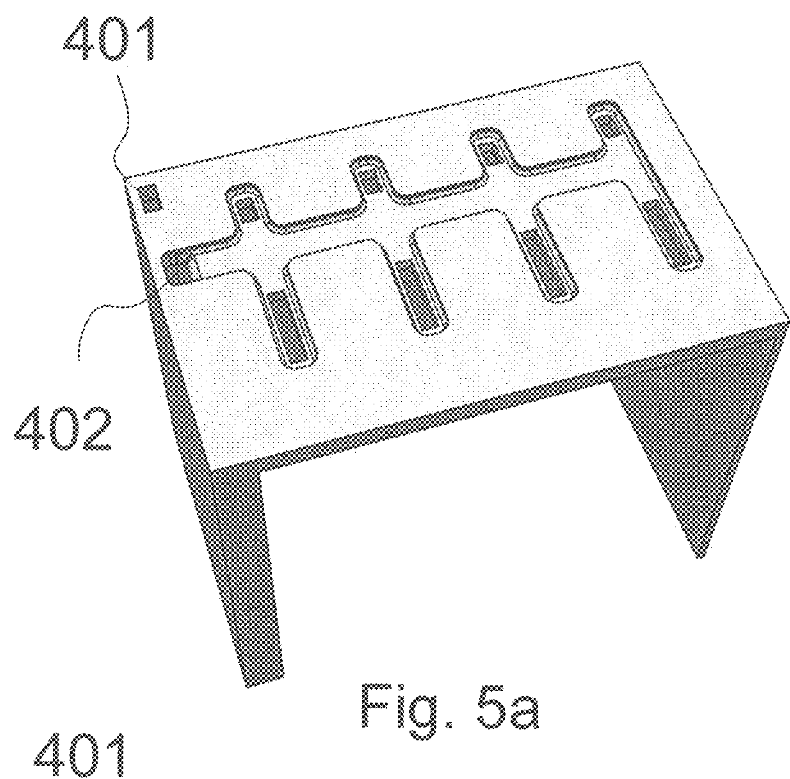
FIGS. 5*a* and 5*b* show two primary modules according to embodiments of the invention.
Figure 5B:
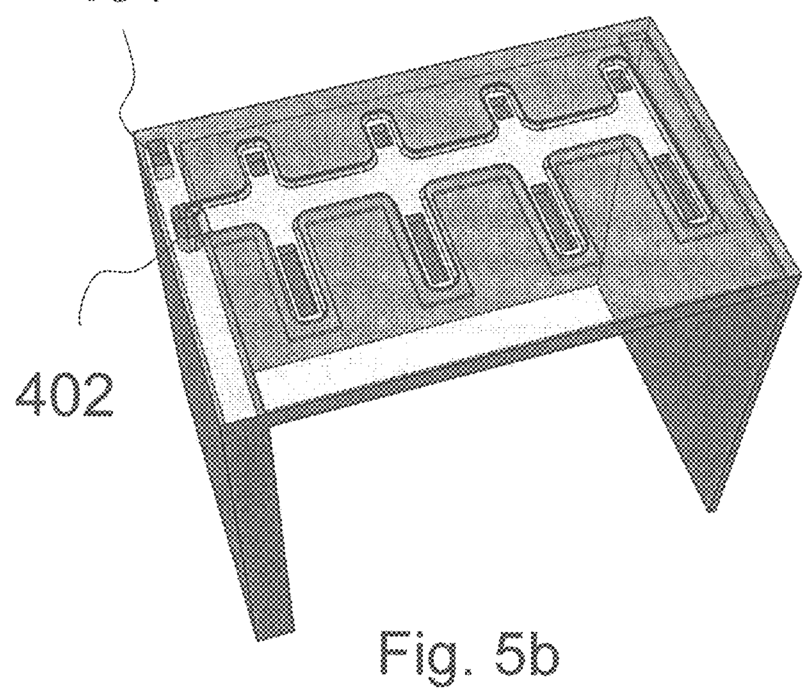

FIGS. 5*a* and 5*b* show two primary modules according to another embodiment of the invention. In special cases, the system column or an equivalent area may be located on the left or right side of the galley (e.g., galleys in front of Door 1 or longitudinal galleys at Door 4). In these cases the two cutouts 401, 402 are located at the side of the work deck.

In addition, let it be noted that "comprising" does not preclude any other elements or steps, and "a" or "an" do not rule out a plurality. Let it further be noted that features described with reference to the above exemplary embodiments may also be used in combination with other features from other exemplary embodiments described above. Reference numbers in the claims are not to be construed as a limitation While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for producing a kitchen arrangement for a cabin of an airplane, the system comprising:

a primary module comprising:

an electrical energy supply device;

a cooling device configured to cool a fluid and provide a stream of the fluid to a fluid outlet;

at least one supply connection, which is configured for supplying the primary module with a requisite;

an electrical connection, which is located on an outer boundary surface of the primary module and is coupled with the electrical energy supply device; and a fluid connection, which is located on the outer boundary surface of the primary module and is coupled with the fluid outlet; and one or more auxiliary modules that are couplable with the primary module;

wherein the outer boundary surface of the primary module is adjusted for coupling with a first auxiliary module of the one or more auxiliary modules, which has a correspondingly shaped boundary surface.

2. The system according to claim 1, wherein the outer boundary surface is arranged on a side or on a rear side of the primary module.

3. The system according to claim 1, wherein the primary module comprises a return flow inlet, through which the stream of the fluid is configured to flow back from the first auxiliary module, which is coupled with the primary module.

4. The system according to claim 3, wherein the return flow inlet comprises a check valve.

5. The system according to claim 1, wherein:

the primary module comprises a base section, a top section arranged thereon, and a working surface arranged between the base section and top section;

the working surface comprises a hollow space, which has an air outlet directed toward the base section and is joined with a cooling air outlet of the cooling device; and the hollow space comprises a cooling air connection that empties into the outer boundary surface.

6. The system according to claim 1, wherein the primary module comprises a covering device that completely seals the fluid outlet flush against the outer boundary surface.

7. The system according to claim 1, wherein:

the first auxiliary module comprises an outer boundary surface, on which an electrical connection and a fluid connection are provided, the fluid connection being connectable with the fluid outlet of the primary module; and the first auxiliary module is devoid of a supply connection for connecting the auxiliary module with a vehicular system.

8. The system according to claim 7, wherein a side of the first auxiliary module that faces away from the primary module is a receiving surface comprising at least one additional electrical connection and an additional fluid connection, which are couplable with a second auxiliary module of the one or more auxiliary modules.

9. The system according to claim 8, wherein the receiving surface is arranged on one side or a rear side of the first auxiliary module.

10. A method of producing a kitchen arrangement for a cabin of an airplane, the method comprising:

providing a primary module comprising:

an electrical energy supply device;

a cooling device configured to cool a fluid and provide a stream of the fluid to a fluid outlet;

at least one supply connection, which is configured for supplying the primary module with a requisite;

an electrical connection, which is located on an outer boundary surface of the primary module and is coupled with the electrical energy supply device; and a fluid connection, which is located on the outer boundary surface of the primary module and is coupled with the fluid outlet; and providing one or more auxiliary modules that are couplable with the primary module, wherein the outer boundary surface of the primary module is adjusted for coupling with a first auxiliary module of the one or more auxiliary modules, which has a correspondingly shaped boundary surface.

11. A vehicle comprising:

a cabin; and at least one kitchen arrangement in the cabin, the at least one kitchen arrangement comprising:

a primary module comprising:

an electrical energy supply device;

a cooling device configured to cool a fluid and provide a stream of the fluid to a fluid outlet;

at least one supply connection, which is configured for supplying the primary module with a requisite;

an electrical connection, which is located on an outer boundary surface of the primary module and is coupled with the electrical energy supply device; and a fluid connection, which is located on the outer boundary surface of the primary module and is coupled with the fluid outlet; and one or more auxiliary modules that are couplable with the primary module;

wherein the outer boundary surface of the primary module is adjusted for coupling with a first auxiliary module of the one or more auxiliary modules, which has a correspondingly shaped boundary surface.

12. The vehicle according to claim 11, wherein the vehicle is an airplane.

* * * * *